(12) United States Patent
Hamlin

(10) Patent No.: US 8,529,264 B2
(45) Date of Patent: Sep. 10, 2013

(54) METHOD FACILITATING LANGUAGE LEARNING

(76) Inventor: Benjamin J. Hamlin, Severn, MD (US)

( * ) Notice: Subject to any disclaimer, the term of this patent is extended or adjusted under 35 U.S.C. 154(b) by 399 days.

(21) Appl. No.: 12/654,592

(22) Filed: Dec. 23, 2009

(65) Prior Publication Data

US 2010/0159425 A1 Jun. 24, 2010

Related U.S. Application Data

(60) Provisional application No. 61/193,784, filed on Dec. 23, 2008.

(51) Int. Cl.
*G09B 19/06* (2006.01)
(52) U.S. Cl.
USPC .......................................................... 434/157
(58) Field of Classification Search
USPC .......................................................... 434/157
See application file for complete search history.

(56) References Cited

U.S. PATENT DOCUMENTS

| | | | |
|---|---|---|---|
| 6,632,094 B1 | 10/2003 | Falcon et al. | |
| 6,661,496 B2 | 12/2003 | Sherman et al. | |
| 6,990,476 B2 | 1/2006 | Wen et al. | |
| 7,149,690 B2 | 12/2006 | August et al. | |
| 2002/0055088 A1 | 5/2002 | Feig | |
| 2003/0040899 A1 | 2/2003 | Ogilvie | |
| 2004/0236565 A1* | 11/2004 | Wen et al. | 704/3 |
| 2005/0208459 A1 | 9/2005 | Chang et al. | |
| 2006/0002684 A1 | 1/2006 | Champel et al. | |
| 2007/0196795 A1 | 8/2007 | Groff | |
| 2007/0281286 A1 | 12/2007 | Palacios Orueta | |
| 2008/0005100 A1 | 1/2008 | Hsu | |
| 2008/0038707 A1 | 2/2008 | Banhazl et al. | |

OTHER PUBLICATIONS

Language learning software by Rosetta Stone, 1 page printed from the Internet Jul. 7, 2008. http://www.rosettastone.com/offer/googlepage?s_kwcid.language%20learning|.

* cited by examiner

*Primary Examiner* — Robert J Utama
*Assistant Examiner* — Evan Page
(74) *Attorney, Agent, or Firm* — Richard C. Litman

(57) ABSTRACT

The method facilitating language learning utilizes a DVD authoring tool to arrange a first stream of video clips and synchronize audio in a target language. The first stream may be comprised of dialogue-rich, live-action films or animations. A symbolic marker is placed in a subtitle track associated with the first stream. The marker symbolizes upcoming complex word usage, grammar patterns, idiomatic expressions, and colloquialisms in the first stream, and is linked to a second stream of video clips, the second stream of video clips including synchronized audio of an instructional nature regarding the target language of the first stream of video clips. During DVD play, user selection of the symbolic marker pauses the first stream and plays the second stream, the first stream resuming upon termination of the second stream. A digital book is included with each DVD including the translated script, vocabulary list, lesson summaries, and exercises.

12 Claims, 2 Drawing Sheets

METHOD FACILITATING LANGUAGE LEARNING

CROSS-REFERENCE TO RELATED APPLICATION

This application claims the benefit of U.S. Provisional Patent Application Ser. No. 61/193,784, filed Dec. 23, 2008.

BACKGROUND OF THE INVENTION

1. Field of the Invention

The present invention relates to multimedia educational devices and methods, and particularly to a method facilitating language learning that uses movie scenes and embedded selection buttons for in-depth instruction regarding the scenes.

2. Description of the Related Art

There has long been video instruction for foreign languages. These videos have been produced using analog methods, and more recently digital methods, including computerized language instruction. However, often these videos lack an effective pedagogical method, and the user would be better served learning the language in more traditional formats, which may provide more solid teaching methodologies. Moreover, with respect to video instruction there has until now remained a dearth of quality foreign language instructional presentations. Too often a product with multimedia capabilities of the computer, DVD media, and the like, may be quickly brought to market, notwithstanding the fact that the product may lack any pedagogical foundation. It would be advantageous to produce in a digital medium a high quality instructional video utilizing a method facilitating language learning with off-the-shelf tools readily available to the language learning authoring community.

Thus, a method facilitating language learning solving the aforementioned problems is desired.

SUMMARY OF THE INVENTION

The method facilitating language learning utilizes a DVD authoring tool to arrange a first stream of video clips and synchronize audio in a target language. The first stream may be comprised of dialogue-rich live-action films or animations. A symbolic marker is placed in a subtitle track associated with the first stream. The marker symbolizes upcoming complex word usage, grammar patterns, idiomatic expressions, and colloquialisms in the first stream, and is linked to a second stream of video clips. The second stream of video clips includes synchronized audio of an instructional nature regarding the target language of the first stream of video clips. During DVD play, user selection of the symbolic marker pauses the first stream and plays the second stream, the first stream resuming upon termination of the second stream. A digital book is included with each DVD, including the translated script, vocabulary list, lesson summaries, and exercises.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
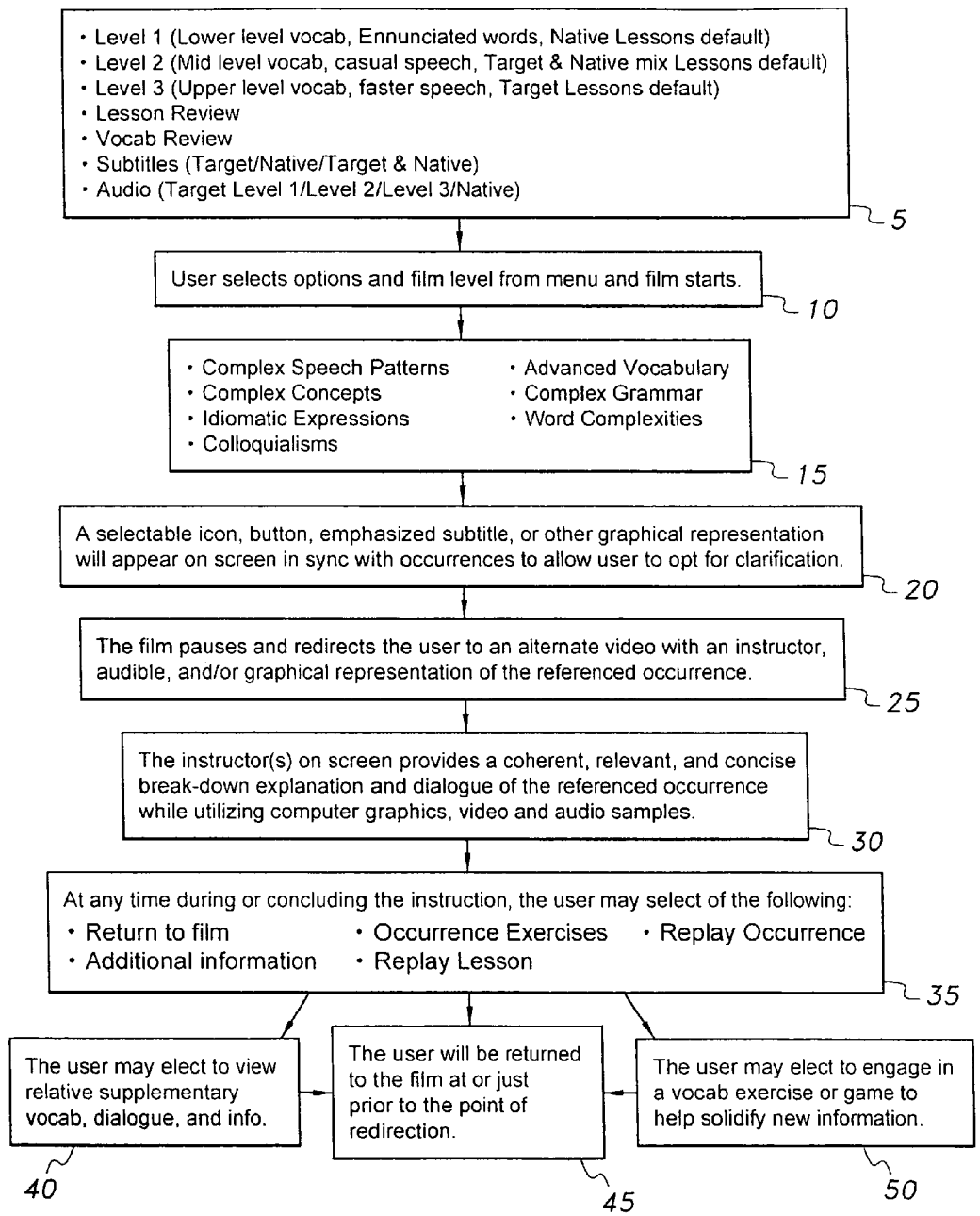
FIG. 1 is a production flowchart of a method facilitating language learning according to the present invention.
Figure 2:
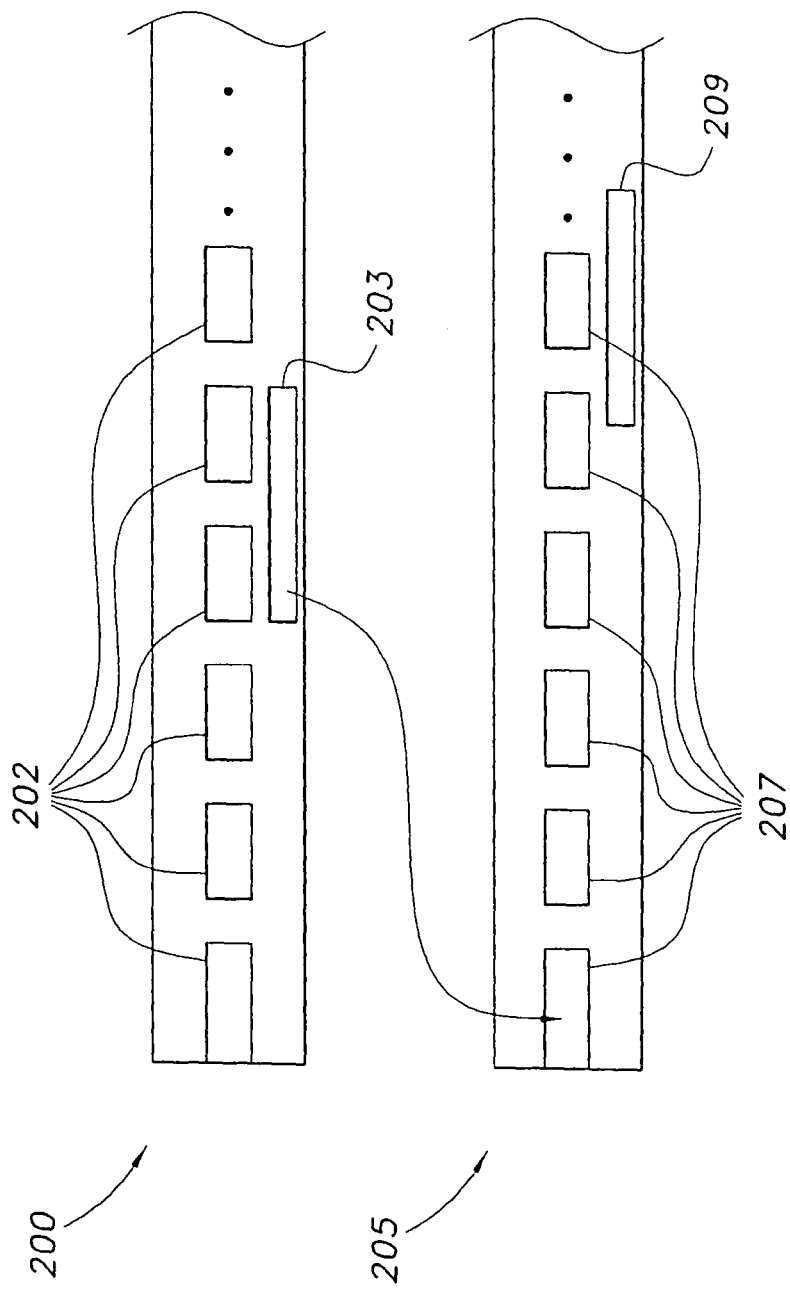
FIG. 2 is a schematic diagram of multimedia track formatting according to the method facilitating language learning according to the present invention.

As shown in FIGS. 1 and 2, the method facilitating language learning utilizes a DVD authoring tool to arrange a first stream 200 of video clips 202 having synchronized audio in target and native languages. The first stream 200 comprises dialogue-rich live-action films or animations. A symbolic marker 203 is placed in a subtitle track associated with the first stream 200. The marker 203 symbolizes upcoming complex word usage, grammar patterns, idiomatic expressions, and colloquialisms in the first stream 200, and is linked to a second stream 205 of video clips 207, the second stream 205 of video clips 207 including synchronized audio of an instructional nature regarding the target language of the first stream 200 of video clips 202.

During DVD play, user selection of the symbolic marker 203 pauses the first stream 200 and plays the second stream 205, the first stream 200 optionally resuming upon termination of the second stream 205. A digital book is included with each DVD including the translated script, vocabulary list, lesson summaries, and exercises. As shown in FIG. 2, a symbolic marker 209 may be embedded in a subtitle track of the second stream 205. Symbolic marker 209 could be linked to yet another instructional track to provide more in depth instruction regarding information in streams 205 and 200.

In the embodiment shown, symbolic markers are formed using Button Over Video, a technology provided, e.g., by Apple®'s DVD Studio Pro 4™. The graphic is imbedded within a subtitle track in order to allow a selectable graphic to overlay the video during a chosen segment of the film. The button functions just like those found on a standard DVD menu. Moreover, other media, in addition to DVDs, are contemplated. For example, Adobe® Flash® CS3 standard functions can be utilized in order to achieve similar but more advanced results for computer-based viewing.

Dialogue-rich live-action films or animations are transcribed, dubbed, and subtitled into target languages. Icons, symbols, and/or emphasized text features are included throughout the film to symbolize the coming of complex word usage, grammar patterns, idiomatic expressions, and colloquialisms. The symbols will provide the user the option to select the icon or text and be redirected to an alternate interactive screen or menu while the film will be paused. At this point, descriptive text, audio and/or video recording of a professor will appear onscreen to provide detailed explanations, instructions, and illustrations to facilitate comprehension of the referenced dialogue. Any time during or at the conclusion of the instructions, the user can select to return to the film or engage in future exercise to assist in the comprehension of the reference dialogue. Learners have the capability of selecting different levels of instruction (beginner/intermediate/advanced) and choose to have the lesson taught in the user's native language or target language. A digital book will be included with each DVD including the translated script, vocabulary list, lesson summaries, and exercises. Three supplementary DVDs are further included (i.e. children's, teen, adult). In this manner, not only will the maturity level of movie content increase, but also the level of vocabulary associated with advancing topics.

As shown in FIG. 1, step 5 presents three user levels as options for selection (e.g., via a menu) by a user. Level 1 is a lower level vocabulary comprising enunciated words and native lessons by default within level 1. Level 2 is a mid level vocabulary comprising casual speech that includes a mix of target and native languages by default within level 2. Level 3 is an upper level vocabulary comprising faster speech. Target language lessons are presented by default in level 3. Lesson and vocabulary review are also presented. Subtitles are presented in target, native, and target & native languages. Audio is presented in target level 1, level 2, level 3, and native languages.

As shown at step 10, after the user has selected options and film levels from the menu, the film starts.

As shown at step 15, a plurality of complex linguistic occurrences can be embedded in the film clips comprising the film. The film clips may include, depending on levels selected by the user, complex speech patterns, complex concepts, idiomatic expressions, colloquialisms, advanced vocabulary, complex grammar, and word complexities.

As shown at step 20, a selectable icon, button, emphasized subtitle, or other graphical representation, e.g., symbolic marker 203, can appear on screen in sync with any occurrence to allow the user to select for clarification of the occurrence.

As shown at step 25, when a user selects the presented button over video, the film pauses and redirects the user to an alternate video with an instructor, audible, and/or graphical representation of the referenced occurrence.

At step 30, the instructor(s) on screen provide a coherent, relevant, and concise breakdown, explanation and dialogue of the referenced occurrence while utilizing computer graphics, video and audio samples.

At any time during or concluding the instruction, (as shown at step 35) the user may select from the following: Return to film (step 45); Additional Information (step 40); Occurrence Exercises (step 50); and Replay Lesson or Replay Occurrence.

Moreover, in step 50, the user may elect to engage in a vocabulary exercise or game to help solidify new information. In step 40, the user may elect to view relative supplementary vocabulary, dialogue, and information. In step 45, the user will be returned to the film at or just prior to the point of redirection.

As used herein, the term "multimedia storage medium" refers to DVDs, laser discs, optical discs, or any other storage media readable by a processor capable of storing video data in digital format. The term "processor" refers to a microprocessor, microcontroller, digital signal processor, application specific integrated circuit (ASIC), or other programmed or programmable device capable of processing signals from input devices converting the data stored on the storage media to signals that can be manipulated by software instructions. The processor may be programmed by machine language instructions, assembly language, C language, C++, Visual C++, Java, Basic, Visual Basic, or any other suitable computer language. The processor may be incorporated into a computer, a DVD player, or any other device for playing back multimedia data. The playback device may have a user interface that includes a keyboard, mouse, joystick, infrared remote control, or any other input device that allows the user to select the symbolic marker 203 to switch tracks as desired.

It is to be understood that the present invention is not limited to the embodiment described above, but encompasses any and all embodiments within the scope of the following claims.

I claim:

1. A method facilitating language learning, comprising the steps of:
   offering a selection of instruction levels including:
   (i) a lower level vocabulary having default native language lessons;
   (ii) a mid-level vocabulary including casual speech and having a default target and native mixed set of lessons; and
   (iii) an upper level vocabulary including faster speech and having target language lessons as default;
   offering lesson and vocabulary reviews;
   providing user selections selectable at any time during or concluding an instruction, the user selections including a "return to lesson" selection, an "additional information" selection, an occurrence "exercise" selection, a "replay lesson" selection, and a "replay occurrence" selection;
   recording a first stream of video clips on a non-transitory multimedia storage medium;
   recording a first audio signal on the non-transitory multimedia storage medium, the first audio signal being synchronized with the first stream of video clips, the first audio signal including a target language;
   recording a first symbolic marker in a subtitle track associated with the a first stream of video clips, wherein said first symbolic marker symbolizes upcoming complex word usage, grammar patterns, idiomatic expressions, and colloquialisms in said first stream
   recording a second stream of video clips on the non-transitory multimedia storage medium;
   recording a second audio signal on the non-transitory multimedia storage medium, the second audio signal being synchronized with the second stream of video clips, the second audio signal being of an instructional nature regarding the target language, further comprising the step of embedding a second symbolic marker in a subtitle track of said second stream, said second symbolic marker being linked to an instructional track providing more in-depth instruction regarding information in said first and second streams;
   linking the first symbolic marker to the a second stream of video clips; and
   playing the non-transitory storage medium on a multimedia player, whereby user selection of the first symbolic marker pauses the first stream of video clips and plays the second stream of video clips, the first stream of video clips, at the option of the user, resuming upon termination of the second stream of video clips.

2. The method facilitating language learning according to claim 1, further comprising the step of embedding said first and second symbolic markers as icon, symbol, and emphasized text indicia associated with said streams, wherein said indicia symbolize the coming of said complex word usage, grammar patterns, idiomatic expressions, and colloquialisms, wherein user selection of said indicia causes content on said multimedia storage medium to be redirected to an alternate interactive screen or menu while said streams are paused.

3. The method facilitating language learning according to claim 1, further comprising the step of recording a digital book in said non-transitory multimedia storage medium, the digital book including a translated script, a vocabulary list, lesson summaries, and exercises.

4. The method facilitating language learning according to claim 1, wherein said recording of the first and second symbolic markers are in first and second streams of subtitles synchronously associated with the first and second streams of video clips.

5. The method facilitating language learning according to claim 1, further comprising the steps of transcribing, dubbing, and subtitling dialogue rich, live action films or animations into said target language.

6. The method facilitating language learning according to claim 1, wherein said second stream comprises video clips and audio displaying descriptive text, audio, and video of an instructor providing detailed explanations, instructions, and illustrations to facilitate comprehension of the referenced stream of video clips.

7. The method facilitating language learning according to claim 1, wherein said "exercise" selection further comprises a selectable option in which a vocabulary exercise or a game is provided to help solidify new information presented to the user.

8. A non-transitory storage medium readable by a processor of a multimedia player, the non-transitory storage medium having stored thereon a set of instructions for playback of multimedia video for teaching a foreign language, the instructions comprising:
(a) a first sequence of instructions which, when executed by the processor, causes the processor to:
offer a selection of instruction levels, said instruction levels including a lower level vocabulary having default native language lessons, a mid level vocabulary which includes casual speech and having a default target and native mixed set of lessons and, an upper level vocabulary which includes faster speech and having target language lessons as default;
(ii) offer lesson and vocabulary reviews; and
(iii) provide user selections selectable at any time during or concluding an instruction, said user selections including a "return to lesson" selection, an "additional information" selection, an occurrence "exercise" selection, a "replay lesson" selection, and a "replay occurrence" selection;
(b) a second sequence of instructions which, when executed by the processor, causes the processor to display a selectable graphic overlaid on playback of a first video stream having foreign language audio;
(c) a third sequence of instructions which, when executed by the processor, causes the processor to interrupt playback of the video in response to input from a person learning the foreign language and switch to playback of an instructional second video stream explaining a complex linguistic occurrence being played back on the first video stream;
(d) a fourth sequence of instructions which, when executed by the processor, causes the processor to provide indicia which symbolize upcoming complex word usage, grammar patterns, idiomatic expressions, and colloquialisms in said first video stream.
(e) a fifth sequence of instructions which, when executed by the processor, causes the processor to embed first and second symbolic markers as icon, symbol, and emphasized text indicia associated with said first and second video streams, wherein said indicia symbolize the coming of said complex word usage, grammar patterns, idiomatic expressions, and colloquialisms, wherein user selection of said indicia causes content on said multimedia storage medium to be redirected to an alternate interactive screen or menu while said video streams are paused;
(f) a sixth sequence of instructions which, when executed by the processor, causes the processor to embed a second symbolic marker in a stream of subtitles of said second video stream, the second symbolic marker being linked to an instructional track providing more in-depth instruction regarding information in said first and second video streams;
(g) a seventh sequence of instructions which, when executed by the processor, causes the processor to form said symbolic markers in said stream of subtitles, said processor embedding a selectable graphic within said stream of subtitles, thereby allowing said selectable graphic to overlay said video stream during a chosen segment of said video stream; and
(h) an eighth sequence of instructions which, when executed by the processor, causes the processor to display descriptive text, audio and/or video recording of an instructor which provides detailed explanations, instructions, and illustrations to facilitate comprehension of the referenced stream of video clips.

9. The non-transitory storage medium readable by a processor according to claim 8, further comprising a ninth sequence of instructions which, when executed by the processor, causes the processor to include a digital book in said multimedia storage medium, the digital book including a translated script, a vocabulary list, lesson summaries, and exercises.

10. The non-transitory storage medium readable by a processor according to claim 9, further comprising a tenth sequence of instructions which, when executed by the processor, causes the processor to transcribe, dub, and subtitle dialogue rich, live action films or animations into said target language.

11. The method facilitating language learning according to claim 4, further comprising the step of using a "button over video" editing tool to form said symbolic markers in said stream of subtitles, said button over video editing tool embedding a selectable graphic within said stream of subtitles, thereby allowing said selectable graphic to overlay said video stream during a chosen segment of said video stream.

12. The method facilitating language learning according to claim 4, further comprising the step of using a software-based design tool to form said symbolic markers and said subtitle streams, said design tool synchronously associating the selectable graphic and the subtitles with the video stream, thereby allowing the selectable graphics to accompany the video stream during a chosen segment of the video stream.

* * * * *